United States Patent [19]
Ludwig et al.

[11] Patent Number: 5,470,669
[45] Date of Patent: Nov. 28, 1995

[54] THERMOELECTROCHEMICAL SYSTEM AND METHOD

[75] Inventors: Frank A. Ludwig, Rancho Palos Verdes; Carl W. Townsend; Bruce M. Eliash, both of Los Angeles, all of Calif.

[73] Assignee: Hughes Aircraft Company, Los Angeles, Calif.

[21] Appl. No.: 336,457

[22] Filed: Mar. 27, 1989

Related U.S. Application Data

[63] Continuation of Ser. No. 789,000, Oct. 18, 1985, abandoned.
[51] Int. Cl.$^6$ .............................. H01M 8/14; H01M 8/18; C25D 17/00
[52] U.S. Cl. .......................... 429/17; 429/20; 429/196; 204/220; 136/206
[58] Field of Search .................... 429/3, 15, 17, 429/20, 108, 152, 153, 164, 196; 204/220; 136/206

[56] References Cited

U.S. PATENT DOCUMENTS

| | | | |
|---|---|---|---|
| 3,536,530 | 10/1970 | Anthes et al. | 429/17 |
| 3,891,532 | 6/1975 | Jensen et al. | 204/265 X |
| 3,920,534 | 11/1975 | Jensen et al. | 204/283 X |
| 4,145,314 | 3/1979 | Fung et al. | 429/40 X |
| 4,215,182 | 7/1980 | Ang et al. | 429/15 |
| 4,292,378 | 9/1981 | Krompelt | 429/15 |
| 4,359,406 | 11/1982 | Fung | 429/40 X |
| 4,410,606 | 10/1983 | Loutfy et al. | 429/17 |
| 4,414,080 | 11/1983 | Williams et al. | 204/242 X |
| 4,478,224 | 12/1979 | Porter | 204/266 X |
| 4,710,588 | 12/1987 | Ellion | 136/206 |
| 5,208,112 | 5/1993 | Ludwig et al. | 429/20 |
| 5,374,490 | 12/1994 | Aldecoa | 429/152 |

*Primary Examiner*—Peter A. Nelson
*Attorney, Agent, or Firm*—Mary E. Lachman; Michael W. Sales; Wanda K. Denson-Low

[57] ABSTRACT

A thermal electrochemical system in which an electrical current is generated between a cathode immersed in a concentrated aqueous solution of phosphoric acid and an anode immersed in a molten salt solution of ammonium phosphate and monohydric ammonium phosphate. Reactants consumed at the electrodes during the electrochemical reaction are thermochemically regenerated and recycled to the electrodes to provide continuous operation of the system.

22 Claims, 3 Drawing Sheets

THERMOELECTROCHEMICAL SYSTEM AND METHOD

The Government has rights in this invention pursuant to SERI Subcontract No. ZX-8-07057-1 under Contract No. DE-AC02-83CH10093 awarded by the U.S. Department of Energy. This application is a continuation of application Ser. No. 06/789,000, filed Oct. 18, 1985, and now abandoned.

BACKGROUND OF THE INVENTION

1. Field of the Invention

The present invention relates generally to thermally regenerative electrochemical systems. In a preferred embodiment, the present invention relates to an improved thermoelectrochemical system which utilizes phosphoric acid and ammonium phosphate as the working fluids in an acid concentration cell.

2. Description of Background Art

Thermoelectrochemical or regenerative electrochemical systems have been investigated extensively since the late 1950's. In these systems, the working substance produced in an electrochemical cell (fuel cell, battery, galvanic system, EMF cell, etc.) is regenerated by the input of thermal energy. These systems are similar to secondary batteries in many respects except that, in the former, regeneration of the electrochemically active electrode reactants is accomplished thermally in many cases rather than electrically.

Representative thermally regenerated electrochemical systems are disclosed in: 1) U.S. Pat. No. 4,292,378 issued to Krumpelt et al on Sep. 29, 1981; 2) U.S. Pat. No. 4,410,606 issued to Loutfy et al on Oct. 18, 1983; and U.S. Pat. No. 3,536,530 issued to Anthes et al on Oct. 27, 1970. The Anthes et al system includes a tellurium chloride electrochemical cell and a regeneration system for thermally regenerating the electrode reactants at temperatures of about 550° C. utilizing complexing agents such as gallium chloride and aluminum chloride.

Krumpelt et al describes a thermoelectrochemical concentration cell which utilizes aluminum metal electrodes and an electrolyte composed of ethylpyridinium chloride solvent and aluminum chloride. An electrical current is generated between the electrodes by maintaining a concentration gradient such that the concentration of aluminum ions is kept low at the anode with a higher concentration being present at the cathode. The concentration gradient in the Krumpelt et al system is maintained by continually cycling the electrolyte to a still where the low boiling aluminum chloride is distilled off to provide a distillate which is high in aluminum ion concentration and a bottoms fraction which is low in aluminum ion concentration. The aluminum ion rich distillate is returned to the cathode to replenish aluminum ions plated out on the cathode while the aluminum ion poor bottoms fraction is returned to the anode to dilute the aluminum ions formed during generation of the electric current. Krumpelt et al further describes the use of iron, antimony and silicon electrodes in combination with ionic solvents such as the salts of various alkali metals, indium, ammonia and $POH_3$ and $SOH_3$ wherein H is a halide.

Loutfy et al discloses a thermoelectrochemical system which is based on a specific characteristic of copper in aqueous solutions. In non-complexing media, such as sulfuric acid, the redox potentials of the $CU(II)/CU(I)$ and $CU(I)/CU(O)$ couples exhibit an order in which the cuprous ion is less stable than the cupric ion. In certain complexing media, such as acetonitrile in sulfuric acid, the copper electrode potentials are inverted because the cuprous complex is more stable than cupric ion. Loutfy, et al utilizes this characteristic of aqueous solutions of copper to provide a variety of electrochemical cells in which electrolytes having different concentrations of complexing agent are used to generate electric potentials. In order to maintain the concentration of complexing agent within the desired ranges, the electrolytes are continually removed from the cell and thermally treated to remove at least a portion of the complexing agent from the solution.

Although the systems described above are suited for their intended purposes, there still is a continuing need to provide additional thermoelectrochemical systems which maximize the efficiencies of the thermal regeneration of reactants and of the electrochemical generation of products at high power density, and which maximize the power density itself, as well as the overall efficiency of the system. Many of the known systems tend to include complicated pumping, plumbing, and separation systems which increase the cost of the system and decrease the overall system efficiency. Further, the electrolytes presently used contain complex reactant mixtures requiring complexing agents and close control of reactant concentrations. Accordingly, there is a continuing need to provide thermoelectrochemical systems having simplified electrolyte compositions and simplified thermal regeneration systems while still providing adequate system efficiency. In addition, it would be desirable to provide a thermoelectrochemical system which utilizes conventional electrolyte materials which are readily available at low cost and present no serious environmental hazards.

SUMMARY OF THE INVENTION

In accordance with the present invention, a system and method are provided in which reactants in an electrochemical cell are simply and efficiently thermally regenerated. The system is based upon providing an electric current between a cathode immersed in a concentrated acid and an anode immersed in a molten salt solution. The acid and salts consumed during generation of the electric current are thermally regenerated.

The thermoelectrochemical system in accordance with the present invention basically includes an electrochemical cell having a cathode compartment and an anode compartment. The two compartments have a common ion permeable separation wall. A cathode and an anode are located within the respective compartments, with the cathode and anode being connectable externally from the system for generation of an electrical voltage and current between the electrodes.

A cathode solution composed of a concentrated aqueous solution of a chosen strong Bronsted acid is located in the cathode compartment in contact with the cathode. During operation of the system, hydrogen gas and a first cell reaction product are generated at the cathode and hydrogen ions are consumed. The system further includes an anode solution composed of a chosen molten salt solution which is located in the anode compartment in contact with the anode. During operation of the system, hydrogen gas is consumed and a second cell reaction product is formed at the anode.

A thermochemical regenerator is provided for thermally converting the first cell reaction product produced in the cathode compartment to the chosen acid and an intermediate regeneration product. Means for transferring the cathode solution from the cathode compartment to the thermal regenerator are also provided. Cathode recycle means are provided for transferring the acid formed in the thermochemical regenerator back to the cathode compartment to replenish the acid consumed during generation of the electrical current.

Regeneration of the molten salt is also provided by a means for combining the intermediate regeneration product produced in the thermochemical regenerator with the second cell reaction product formed in the anode compartment to produce the molten salt. A means for removing heat resulting from this combining reaction is also provided. The salt formed in the combining means is recycled back to the anode compartment to replenish the salt consumed during generation of the electrical current.

Storage tanks for the regenerated electrolyte may be provided if it is desired that the electrochemical cell operate during periods with no heat input to the thermal regenerator. Storage tanks may also be provided to accumulate spent electrolyte until the thermal regenerator is reactivated.

The thermal conversion of the first cell reaction product to the chosen acid and an intermediate regeneration product and subsequent combination of the latter with the second cell reaction product to form the chosen salt provides an energy efficient and simple means for continually replenishing the reactants consumed during operation of the cell to provide a continuous thermoelectrochemical system which is especially well suited for widespread earth or space use. The system requires no moving parts except for some small pumps and therefore is expected to provide years of trouble free, low maintenance operation. The system is well suited for use as a bottoming cycle and for use in solar thermal combined cycle systems.

The above-discussed and many other features and attendant advantages of the present invention will become apparent as the invention becomes better understood by reference to the following detailed description when considered in conjunction with the accompanying drawings.

DETAILED DESCRIPTION OF THE INVENTION

For ease of understanding, the present invention will first be described in detail for a preferred embodiment thereof using phosphoric acid and ammonium phosphates as the working fluids; and then a discussion in more general terms will be provided.

Figure 1:
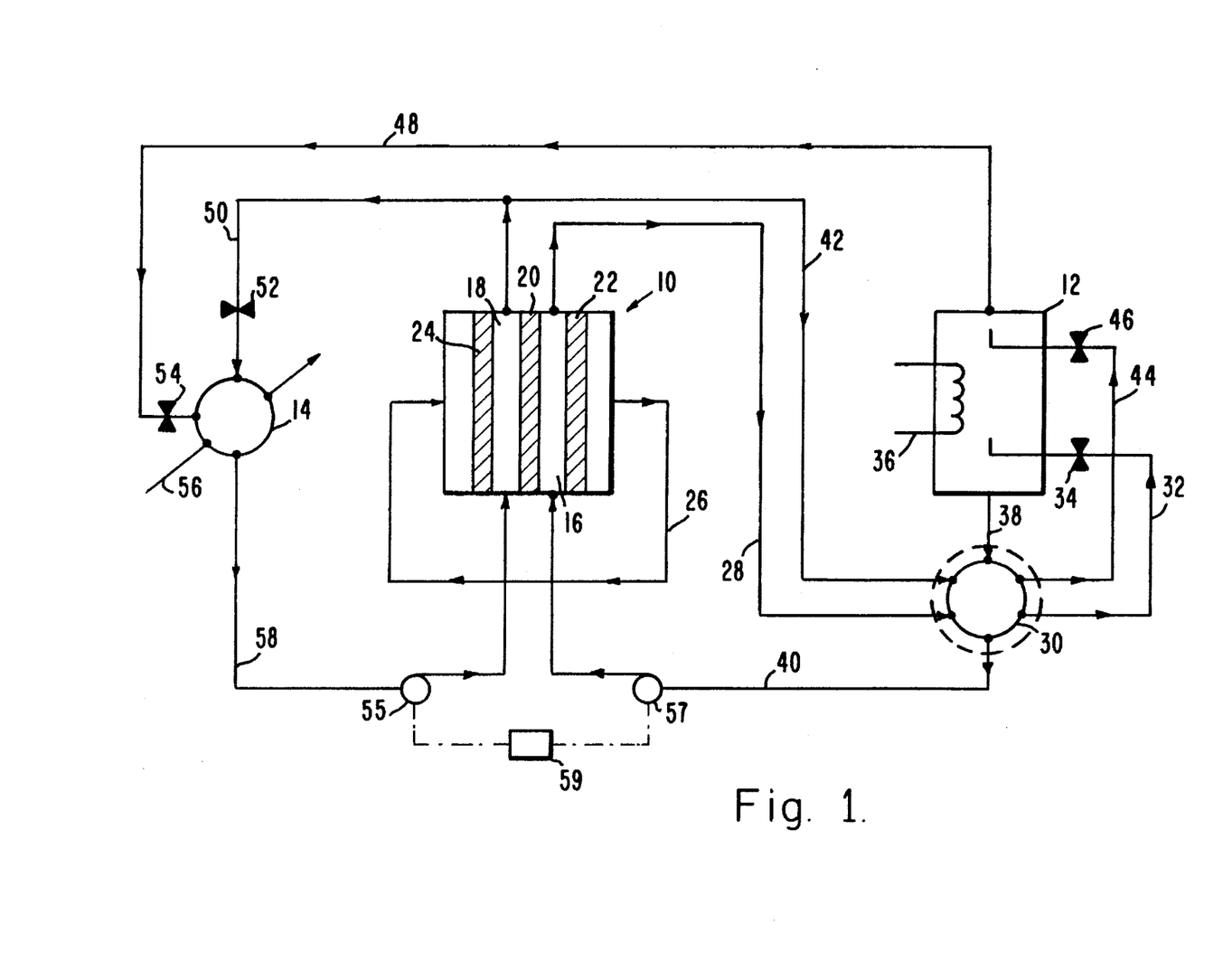
FIG. 1 is a schematic representation of a preferred exemplary system in accordance with the present invention.

An exemplary system in accordance with the present invention is shown schematically in FIG. 1. The system basically includes: an electrolytic cell shown generally at 10; and a flash stripper 12 and a condenser 14 for regenerating reactants consumed in cell 10 and for removing heat. The electrochemical cell 10 is a conventional electrochemical cell having a cathode compartment 16 and an anode compartment 18. The two compartments are separated by a common ion permeable separation wall 20. The separation wall 20 can be any conventional porous material or semi-permeable membrane which is unattacked by phosphoric acid at 150° C. Microporous membranes, such as wettable porous teflon, which have no selectivity for anions or cations are suitable, and cation permeable membranes, such as NAFION® available from Du Pont, are preferred.

The electrochemical cell 10 includes a cathode 22 and anode 24. The cathode and anode should be inert electrodes, i.e. unchanged or unattacked by the electrode reaction, such as platinum or nonporous palladium-silver alloy electrodes or other conventional fuel cell electrodes such as porous graphite-teflon platinized fuel cell electrodes. In the latter case, the structure typically contains approximately 0.25 grams of platinum per square foot of electrode and has a graphite backing structure to provide current collection capability. Alternatively, an enmeshed tantalum screen is provided as a current collector and is backed by a sheet of porous Teflon. It should also be noted that a palladium alloy electrode may be preferable to a fuel cell electrode for the anode in order to prevent the passage of ammonia through the electrode. Based on the performance of these various electrodes in known phosphoric acid fuel cells, which operate under conditions nearly identical to the conditions used in the process of the present invention, it is anticipated that these electrodes will have maintenance-free lifetimes of approximately 100,000 hours due to the absence of catalytic poisons. Further, these electrodes allow the electrochemical system of the present invention to operate at high power densities. The electrodes 22 and 24 are connectable to an external circuit (not shown) for generating an electrical current and voltage. The external circuit can include electric motors or other systems for utilizing the electric energy generated by cell 10.

The phoshoric acids and their salts are well suited as electrolytes and working fluids for practising the present invention since their oxidation state is very stable. In addition, they systematically dehydrate to form the series: ortho-, pyro- and metaphosphates. As ammonium ortho- and pyro-phosphate mixtures, they form low melting fused salts. As a tribasic acid, the three acid dissociation constants for ortho-phosphoric acid span a very wide range, from $10^{-2}$ to $10^{-13}$ at 25° C., which is desirable for acid concentration cells. Since the vapor pressure of ammonia from the salt is quite high, whereas the vapor pressure of $P_2O_5$ from the phosphate is quite low, the addition of hydrogen ion to the phosphate radical by vaporization of ammonia from its salt can be accomplished rather simply at convenient intermediate temperatures.

The electrolyte in the cathode compartment 16 shown in FIG. 1 is preferably a molten acid-salt mixture or concentrated aqueous solution of ammonium hydric phosphates and phosphoric acids, and may include ortho-phosphoric acid ($H_3PO_4$), pyrophosphoric acid ($H_4P_2O_7$), metaphosphoric acids ($HPO_3)_n$, and ortho- and pyro-hydric ammonium phosphates exemplified by $NH_4H_2PO_4$ and $NH_4H_3P_2O_7$.

The electrolyte in the anode compartment 18 is preferably a mixture of ammonium ortho- and pyro-phosphates and ammonium hydric ortho- and pyro-phosphates exemplified by $(NH_4)_3PO_4$, $(NH_4)_4P_2O_7$, $(NH_4)_2HPO_4$ and $(NH_4)_3HP_2O_7$. These salt combinations form fused salts melting at about 160° C. If the cell is operated at very high rates, the ammonium phosphates may be completely reacted and some dihydric salts may be formed. The orthophosphoric, metaphosphoric and pyrophosphoric acids and their salts have various degrees of dehydration. The ratio of ortho:pyro:meta can be controlled by controlling the amount of water in the system, which, in turn, affects the operating performance of the system.

One of the key factors determining the amount of water which should be added to the system is based on the transport of water along with ammonium ion through the cation exchange membrane used as the separator in the cell. Preferably the transported mole ratio of $H_2O/NH_4^+$ is kept at approximately 1:1. This ratio can be realized if the molten salt in the anode compartment contains, as a minimum, a mole ratio of 1:1 for $H_2O/NH_4^+$ in solution.

The term "molten salt solution" is used herein to designate a solution comprising molten salts and a relatively small amount of water. The term "concentrated aqueous solution" is used herein to designate a concentrated solution, such as concentrated phosphoric acid, containing a minimal amount of water. The amount of water in the system must be sufficient to aid in the transport of cell products and regeneration products and to maintain the fluidity of the system. However, the water content cannot be so high that evaporation of solvent water in the stripper significantly reduces the efficiency of the system. This aspect of the present invention is discussed in further detail below.

The working fluid in the closed loop system in accordance with the process of the present invention is therefore completely defined by specifying the amounts of $NH_3$, $H_3PO_4$ and $H_2O$ initially added to the system. The concentrations of these components in the various parts of the system are not specifically set forth since these concentrations will automatically establish themselves during system operation and are dependent on system design and operating conditions. However, it is expected that in the cathode compartment the reactant influx solution composition should be rich in the phosphoric acids compared to the hydric ammonium phosphates, whereas the efflux will be the reverse. In the anode compartment the influx should be rich in ammonia and ammonium ion, with low concentrations of monohydric ammonium phosphates, and the efflux should be the reverse. However, the anode compartment can be operated over wide limits, so that the efflux can be completely converted to several of the hydric ammonium phosphates. The preferred composition added initially into the system is described hereinbelow.

It is preferable to minimize the resistance of the electrical path through the cell from electrode 24 to electrolyte 18 through membrane 20 to electrolyte 16 and into electrode 22, in order to minimize internal losses in the system, which, in turn, results in higher efficiency and allows higher current density. The following methods can be used to minimize resistance: minimization of the thickness of electrolyte compartments 18 and 16, minimization of the membrane thickness 20, minimization of the specific resistance of the electrolytes by adjusting the compositions, and minimization of the specific resistance of the membrane by proper choice of membrane and proper membrane pretreatment procedures. For example, a porous teflon membrane can be treated with sodium metal dispersions to make the teflon wettable. Perfluorosulfonate polymer cation exchange membranes must also be pretreated by standard methods known in the art to prepare them for exchange processes in the types of electrolytic solutions in which they are to be used.

In the thermoelectrochemical thermodynamic cycle of this invention, the amount of water used as solvent must be kept quite low in the cathode loop, or else its vaporization and condensation around the closed cycle will detract heavily from the energy conversion efficiency. However, in the present system, a small amount of water is required in both the anode and cathode compartments for reasons previously discussed and to help establish the ratio of ortho- to pyro-phosphates for both the acids and their salts by the representative reaction shown in Equation (1).

$$2H_3PO_4 \rightleftharpoons H_2O + H_4P_2O_7 \qquad (1)$$

Since the node loop is the condensation loop, and is not heated to high temperature, a higher concentration of water is expected in the anode loop than in the cathode loop. The presence of both ortho- and pyrophosphates or the presence of both orthophosphates and water is needed to lower the melting point of the salt mixture and the viscosity of the acid. Water is also needed because it catalyzes the breakup of polyphosphate polymer chains, thereby maintaining high fluidity. The proper amount of water, $H_3PO_4$ and $NH_3$ can be added to the system in the following way. When originally adding the working fluids before the system is sealed, there is added approximately one part $H_3PO_4$ (from an aqueous solution of about 20–100 weight percent $H_3PO_4$), approximately one to four parts $(NH_4)_2HPO_4$, and approximately one part $NH_4H_2PO_4$. Parts are here defined on a mole basis. The parts are first mixed and then added to both the anode and cathode compartments. The mixed parts can be preheated before adding to the system if care is taken to not lose water or ammonia during the heating. Heating to about 200°–230° C. and then cooling to about 150° C. before adding to the system serves to enhance fluidity for easier filling of the system, since supercooling takes place. The 20–100% $H_3PO_4$ serves to supply the needed water, as does the subsequent water formation during the heating of the orthophosphates. The exact ratio of salts, salts to acid, and water to salts and acid depends upon system design, desired upper and lower temperatures, desired trade-offs between system efficiency and system weight, between system efficiency and system volumetric power density, and between system efficiency and system gravimetric power density. Depending on these variables in system design and requirements, the working fluid overall composition can vary over about 0.1–6 parts $(NH_4)_2HPO_4$, 0.1–2 parts $NH_4H_2PO_4$, 0.1–2 parts 100% $H_3PO_4$ and 0.1–50 parts water. The salts $(NH_4)_2HPO_4$ and $NH_4H_2PO_4$ cannot both be zero. Parts are here defined on a mole basis. In addition, some water must always be present, though it can be partially supplied by the conversion of ortho- to pyrophosphates.

The representative reactions at the cathode and anode for the above-described system are as shown in Equations (2) and (3) below. At the cathode:

$$H_3PO_4 + e^- \rightarrow \tfrac{1}{2}H_2 + H_2PO_4^- \qquad (2)$$

At the anode:

$$(NH_4)_3PO_4 + \tfrac{1}{2}H_2 \rightarrow (NH_4)_2HPO_4 + NH_4^+ + e^- \qquad (3)$$

Some dihydric salt can also be formed if the $(NH_4)_3PO_4$ is completely reacted. The above two reactions yield the representative net cell reaction shown in Equation (4) below, assuming the use of a cation exchange membrane and transport of $NH_4^+$ from the anode to the cathode.

$$(NH_4)_3PO_4 + H_3PO_4 \rightarrow (NH_4)H_2PO_4 + (NH_4)_2HPO_4 \qquad (4)$$

Similar reactions can be written for the pyrophosphate species and the net reaction is shown in Equation (5) below.

$$H_4P_2O_7 + (NH_4)_4P_2O_7 \rightarrow NH_4H_3P_2O_7 + (NH_4)_3HP_2O_7 \qquad (5)$$

The electrochemical cell 10 shown in FIG. 1 is basically an acid concentration cell in which the dilute side of the cell (i.e., the anode compartment) is buffered so as to minimize mass transport polarizations and thereby permit high power density operation. As can be seen from the cathode reaction of Equation (2) above, phosphoric acid in the cathode electrolyte is continually consumed, with hydrogen gas and dihydric ammonium phosphate being continually generated. In order to maintain the desired phosphoric acid concentration in the cathode electrolyte, it is necessary to continually remove the cathode solution or electrolyte from the cathode compartment and regenerate phosphoric acid.

At the anode, as indicated in the reaction of Equation (3) above, ammonium phosphate and hydrogen gas are continually consumed, with monohydric ammonium phosphate being continually generated. In order to maintain the desired concentrations of ammonium phosphate and monohydric ammonium phosphate, the anode electrolyte or solution must be continually removed from the anode compartment and treated to reduce the amount of monohydric ammonium phosphate in the solution and increase the ammonium phosphate concentration. In addition, hydrogen gas must be continually introduced into the anode compartment 18 for contact with anode 24. It is preferred that the hydrogen gas generated at the cathode 22 be removed from the cathode compartment 16 and introduced into the anode compartment 18 as represented by line 26 in FIG. 1 in order to provide the necessary hydrogen gas for the anode half-reaction.

Several of the above-described cells can be connected in series to produce any desired voltable. Hydrogen gas from one cell can be directly fed into the next cell provided that ammonia diffusion in the reverse direction is prevented. This can be accomplished by a pump and manifold system or by using electrodes, such as silver-palladium alloy electrodes, which are non-permeable to ammonia, but permeable to hydrogen. For example, a practical high power density design can be constructed which utilizes bipolar series stacking. One side of a palladium alloy electrode faces the cathode compartment and passes hydrogen through the electrode to the other side which faces the anode compartment. The palladium electrode keeps ammonia from passing from the anode compartment to the cathode compartment. Two electronically shorted fuel cell electrodes, back to back, would similarly transport hydrogen gas in a bipolar stack. Some ammonia would pass in a countercurrent flow. When using series-stacked cells, care must be taken to prevent electrolytic current leakage through the solution manifolds. This result can be accomplished by using long, minimum cross-section, non-conductive electrolyte solution manifolds, or by breaking the leakage paths by means of a dripping electrolyte feed system. Another method for preventing electrolytic leakage involves running each cell in a batch process so that each cell is refilled sequentially. Non-conductive valves isolate the cells from the manifold at all other times.

Regeneration of the phosphoric acids contained in the cathode solution is accomplished by continually removing cathode and/or anode solution from the cathode compartment 16 solution or cathode solution and the anode compartment 18 and thermally treating the solution in order to thermally decompose the ammonium cation of the phosphate salts to form liquid phosphoric acids and gaseous ammonia. The ammonia gas is separated from the liquid. Several methods can be used to effect this separation with tradeoffs between simplicity, efficiency and power output. Three methods are described herein. In the first method as shown in FIG. 1, the cathode solution is preferably passed through line 28 to a heater such as heat exchanger 30 where the solution is heated to a temperature of about 495° C. by exchanging heat with phosphoric acid introduced into the heat exchanger through line 38, as discussed below. The heated solution is then passed through line 32 as controlled by valve 34 into the flash stripper 12. The flash stripper is of conventional design with means being provided in the flash stripper, such as heat input 36 for maintaining the temperature in the flash stripper at a temperature within the range of about 300° C., to 650° C., which is sufficient to convert most of the dihydric ammonium phosphate to phosphoric acid and ammonia according to Equation (6) below.

$$NH_4H_2PO_4 \rightarrow H_3PO_4 + NH_3 \qquad (6)$$

Some water vapor must also be evaporated with the $NH_3$ gas and should likewise be condensed with the ammonia during reaction (7) indicated below. The ammonia and water are then separated gravitationally from the phosphoric acid due to their different densities. In zero gravity situations, such as space, separation can be effected by centrifugual force or by use of a capillary bed.

Heat input 36 can be accomplished either directly, such as by concentrated solar energy or fossil fueled burners, or indirectly, by means of a secondary heat transfer fluid, such as liquid sodium or high pressure steam. Direct sources are preferred, due to the inherent losses of all secondary heat transfer methods.

The phosphoric acid formed in flash stripper 12 is removed from the flash stripper through line 38 and passed to the heat exchanger 30 where it is cooled to temperatures below 200° C. and above about 100° C. The heat given off by the phosphoric acid is transferred in the heat exchanger 30 into the cathode solution which has been introduced into the heat exchanger through line 28 and the portion of the anode solution which has been introduced into heat exchanger 30 through line 42. The electrolyte containing the regenerated phosphoric acid is passed from the heat exchanger 30 through line 40 back to the cathode compartment 16. It is preferred that the temperature of both the cathode and anode solutions be maintained above about 100° C. in order to keep the viscosity of the solutions at levels so that mass transport rates are rapid enough for the desired electrochemistry at the cathode and anode. Preferred temperatures for the solution in the cathode compartment are between about 105° C. and 160° C., but can approach 200° C. The anode solution temperatures may be slightly lower, in the range of about 100° C. to 140° C., but can also approach 200° C. The particular temperature chosen for the electrolyte solutions may be varied so long as satisfactory liquid properties are maintained in the system.

All of the cell transference is preferably by migration of the ammonium cation and water across the semipermeable membrane 20. However, if all cell transference cannot be achieved by the ammonium cation migration, then a partial flow of the anode solution through lines 42 and 44 to the flash stripper 12 may be necessary. Additional phosphoric acid produced in the flash stripper from the partial flow through lines 42 and 44 is used to supplement the phosphoric acid transferred through lines 38 and 40 to the cathode compartment 16. When all cell transference is by ammonium cation migration across separation wall 20, then valve 46 is closed.

The ammonia and water which are generated in flash stripper 12 are passed through line 48 to condenser 14. In condenser 14, the ammonia and water are reacted with anode solution which is removed from the anode compartment 18 through line 50. Valves 52 and 54 are provided to control the flow of reaction streams into the condenser 14. Condenser 14 acts as a combining means in which the ammonia and monohydric ammonium phosphate react to form ammonium phosphate according to the reaction shown in Equation (7).

$$NH_3 + (NH_4)_2HPO_4 \rightarrow (NH_4)_3PO_4 \qquad (7)$$

The ammonium phosphate formed in condenser 14 is cooled to a temperature of about 100°–130° C. by suitable means such as a radiator or heat exchanger as represented by arrow 56 in FIG. 1. The combining of reactants and the heat exchange discussed immediately above may be accomplished in a single means, such as condenser 14, or may be accomplished in separate combining means and heat exchange means. In the latter case, a portion of the cooled solution must be fed back into the combining means to prevent excessive temperature rise therein. The anode solution containing regenerated ammonium phosphate is passed from condenser 14 through line 58 to the anode compartment 18 to replenish the ammonium phosphate consumed during operation of the system.

Pumps 55 and 57 are included in the system to provide pressurization of the system and circulation of the various solutions. Pressures of about 5–400 psia (34–2760 kilopascals) may be used. In the presently described system, the vapor pressure is higher on the anode side of the cell compared to the cathode side. The passage of ammonia from the anode to the cathode side must be avoided in all forms except by means of electrochemical transference of the ammonium ion. Therefore, the two connecting passages for ammonia, 26 and 20 in FIG. 1, must be blocked. In line 26, which is a hydrogen gas connection, hydrogen flows counter current to ammonia, and a pump or turbine can be installed in line 26 to block all flow of ammonia. With regard to blocking the second connecting passage, separator 20, this separator can be provided as a perfluorinated sulfonic acid membrane which is highly impermeable to gases. On the other hand, the pressure developed by pumps 55 and 57 must be kept high enough to prevent boiling of ammonia in the heat exchanger 30 at temperatures just below the stripper temperature. Since the pressure will be high enough at 100–200° C. to keep the ammonia dissolved in the electrolyte as $NH_4^+$ ions, a simple microporous membrane such as wettable porous teflon can be used. If porous fuel cell electrodes are used, the pressure of hydrogen gas in line 26 must be kept equal to that in lines 28, 42, and 50 so that the liquid interface of the electrolyte can be maintained within the solution side of the porous fuel cell electrode. For this reason, the porous teflon sheet backed fuel cell electrode previously discussed is preferred.

High pressure, such as up to 400 psia (2760 kilopascals) is maintained in the cell 10, in lines 50, 28, 32, 42, 26 and 44 and in the heat exchanger 30 in order to prevent boiling in the system where boiling is undesired. System efficiency is also maximized by virtue of absorbing all heat at the upper temperature. The abovenoted high pressure part of the system is always kept at higher pressure than the remainder of the system. The specific pressures used depend on the ammonia and water vapor pressures, which are determined by the particular working fluid compositions used when the system is initially filled, and by the system upper and lower temperatures. The vapor phases of the system of the present invention contain ammonia, water vapor, small quantities of phosphoric oxide and, under some circumstances, optionally added nitrogen. Hydrogen, at low pressure, may be present in line 48 and in stripper 12 and condenser 14. The partial pressures of ammonia and water vapor may each be varied from about 1 to 300 psia (7–2068 kilopascals) while the nitrogen gas may be varied from about zero to 150 psia (1034 kilopascals). A conventional controller 59 may be provided to control the pumps and/or valves to provide desired differential pressures across membrane 20. This differential pressure must be close to zero to keep forced convection through 20 within desired limits.

Figure 2:
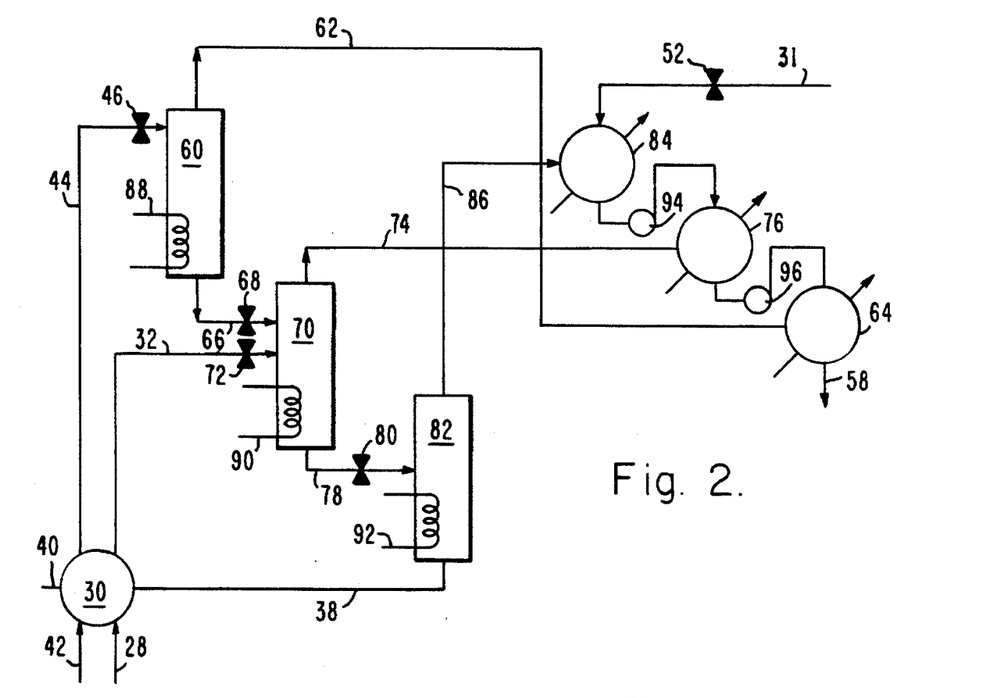
FIG. 2 is a schematic representation of a second, alternate method for regenerating ammonia in accordance with a preferred exemplary system of the present invention.

FIG. 2 depicts a second, alternate method for accomplishing thermal regeneration of the cell reactants by a multi-stage ammonia separation using counter-current flow. Although this system is more complex, greater separation of ammonia from phosphoric acid is possible and hence will generate higher voltage and increased efficiency. For convenience, in FIG. 2 the elements which are the same as those in FIG. 1 are designated by the same reference designator as in FIG. 1o In this multi-stage system shown in FIG. 2, fluid from the anode compartment is heated to about 500° C. and passed into flash stripper 60. The high pressure ammonia generated in this stripper is conducted through line 62 to condenser 64 where it converts the maximum amount of monohydric ammonium phosphate to ammonium phosphate. The partially converted mixture of phosphoric acid and dihydric ammonium phosphate in stripper 60 is then passed through line 66, through valve 68 and into stripper 70, where it joins the preheated stream from the cathode compartment, through line 32 and valve 72. More ammonia is driven off, though at a lower pressure than stripper 60. This ammonia is conducted through line 74 to condenser 76, where an intermediate amount of monohydric ammonium phosphate is converted to ammonium phosphate. The liquid from stripper 70 is then conducted through line 78 and valve 80 to stripper 82. Meanwhile, spent fluid from the anode compartment is conducted through line 31, through valve 52, into condenser 84. The relatively low ammonia pressure in condenser 84 draws off more ammonia from the fluid in stripper 82 through line 86. The resulting liquid leaving stripper 82 through line 38 is thus essentially ammonia-free.

Heat is supplied to the three strippers 60, 70, and 82 through coils 88, 90, and 92 to maintain high temperatures. Pressure is controlled by the settings of valves 46, 68, 72, 80 and 52. Pumps 94 and 96 are used to boost pressure and circulate fluid through the condensers 76 and 64. Water or other fluid is circulated through condensers 84, 76, and 64 to remove heat and maintain the temperatures at about 130° C. Other means of removing heat can also be used.

It should be noted that more or fewer than three stripper-condenser combinations can be used, depending on the degree of separation desired and the limitations on complexity. In addition, when all cell transference is accomplished by the ammonium ion ($NH_4^+$), stripper 60 and condenser 64 are not needed, and valve 46 is closed.

Figure 3:
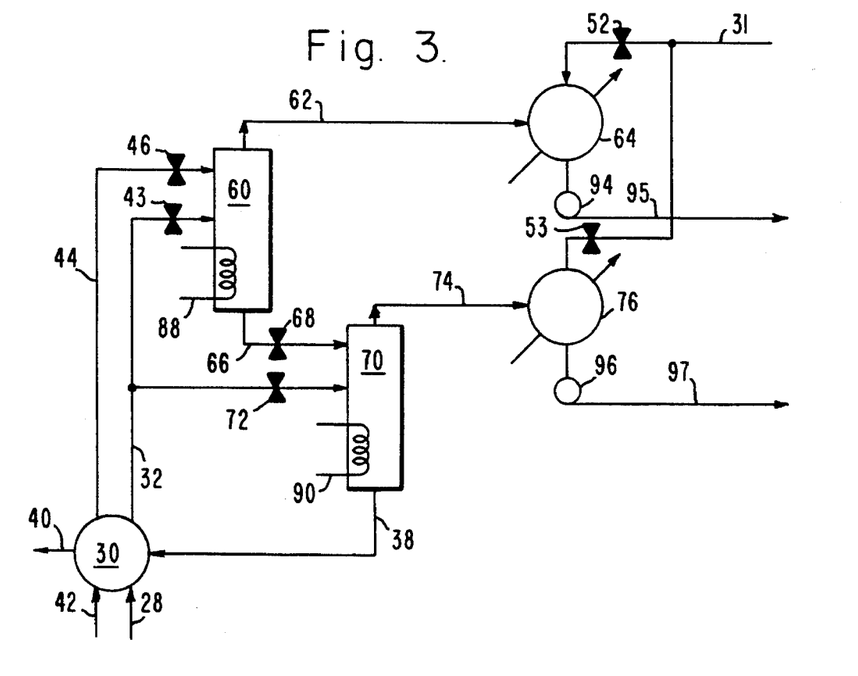
FIG. 3 is a schematic representation of a third, alternate method for regenerating ammonia in accordance with a preferred exemplary system of the present invention.

FIG. 3 depicts a third method for thermal regeneration by multi-stage ammonia separation using cross-current flow. This systems produces two concentrations of ammonium phosphate, which would require separate manifolds into a multi-cell battery. Voltages would be slightly different for the two streams, and varying the number of cells using fluid from each stream provides a convenient way of varying output voltage In the description of FIG. 3, the structures which are the same as those in FIG. 2 are indicated by the same reference designators as used in FIG. 2. In FIG. 3, fluid from the anode compartment is heated to high temperature by heat exchanger 30 and passed through valve 46 into flash stripper 60. The high pressure ammonia generated in this stripper is conducted through line 62 into condenser 64 where it converts the maximum amount of monohydric ammonium phosphate to ammonium phosphate. The partially converted mixture of phosphoric acid and dihydric ammonium phosphate in stripper 60 is then passed through line 66, through valve 68, and into stripper 70, where it joins the preheated stream from the cathode compartment which is introduced through line 32 and valve 72. More ammonia is driven off, though at a lower pressure than in stripper 60. The ammonia is conducted through line 74 into condenser 76 where a lesser amount of monohydric ammonium phosphate is converted to ammonium phosphate. The liquid from stripper 70 is then conducted out through line 38 and is essentially ammonia-free. Meanwhile, spent fluid from the anode compartment is conducted through line 31 and is split into Streams 1 and 2. Stream 1 is conducted through valve 52 into condenser 64, where the maximum amount of monohydric ammonium phosphate is converted to ammonium phosphate. The fluid is pumped from condenser 64 by pump 94 into line 95, toward the anode compartment of the cell. This regenerated fluid from condenser 64 will produce a relatively high voltage in each cell in which it is used. Stream 2 of spent anode compartment fluid from line 31 is passed through valve 53 and into condenser 76 which is at a lower pressure than condenser 64. In condenser 76, the monohydric ammonium phosphate is converted into a lesser amount of ammonium phosphate than is formed in condenser 64; and the conversion product is then pumped by pump 96 into line 97, toward the anode compartment of the cell. This regenerated fluid from condenser 76 will produce a lower voltage in each cell in which it is used as compared to the regenerated fluid from condenser 64.

Heat is supplied to strippers 60 and 70 through coils 88 and 90 to maintain high temperatures within the range of about 300°–650° C. Pressure is controlled by the settings of valves 46, 68, 72, 52 and 53. Pumps 94 and 96 are used to boost pressure and circulate fluid through condensers 64 and 76. Water or other fluid is circulated through condensers 64 and 76 to remove heat and maintain temperatures at about 130° C. Other means of removing heat can also be used.

It should be noted that when all cell transference is accomplished by the ammonium ion ($NH_4^+$), valve 46 can be closed. In this case, some of the fluid from line 32 is passed through valve 43 into stripper 60.

With regard to ammonia, it should also be noted that ammonia can be lost at the anode. Although hydrogen is oxidized in preference to ammonia, very small currents representing the gradual oxidation of ammonia to nitrogen can take place. If the extremely gradual breakdown of ammonia adversely affects system performance prior to the end of the expected lifetime of the device, it is a simple matter to automatically inject a small amount of replacement ammonia from a small storage tank of liquid ammonia. The accumulated nitrogen formed by oxidation of the ammonia could be retained or vented. If silver-palladium electrodes are used, the nitrogen would collect at the condenser part of the system and could be automatically vented. If fuel cell electrodes are used, the nitrogen would collect in the hydrogen feed lines to the anodes, and would be more difficult to vent.

Figure 4:
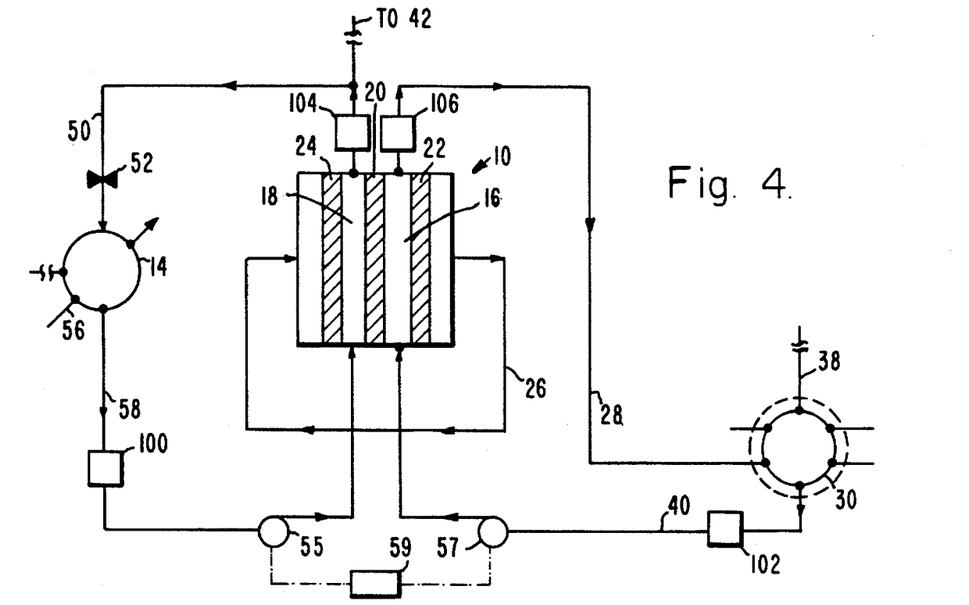
FIG. 4 is a schematic representation of a portion of the system of FIG. 1 showing the alternate use of storage tanks for spent electrolytes and for regenerated electrolytes

Energy storage for the above-described system can be provided in order to allow the electrochemical cell to operate during periods with no heat input to the thermal regenerators. To accomplish this purpose, storage tanks 100 and 102 for regenerated electrolytes are inserted into the system in lines 58 and 40 as shown in FIG. 4, which is a schematic diagram of a portion of the system shown in FIG. 1. Electrolytes stored in these tanks can then be fed into the cell while the thermal regenerator is not operating. In addition, when the thermal regenerator is not operating, spent electrolytes from the cell can be stored in tanks 104 and 106 located in lines leading to 50, 42 and 28, as shown in FIG. 4. Upon reactivation of the thermal regenerator, spent electrolyte can be regenerated and again stored in the original tanks 100 and 102 for regenerated electrolytes. By proper sizing of the tanks, cell, and thermal regenerator, continuous cell operation can be maintained with intermittent operation of the regenerator. Such a system is ideally suited for variations in solar flux due to night conditions or variable cloud cover, or for varying load demands.

Valves 34, 46 and 52 shown in FIGS. 1–3 can be replaced by turbines to extract energy, due to the fact that the fluid undergoes a significant pressure drop at these points. The energy content is very small compared to the system energy and is approximately equal to the energy used for the two pumps 55 and 57.

With regard to the materials for construction of the components shown in FIG. 1, it must be recognized that phosphoric acid is extremely corrosive above 350° C., and that ceramics, graphite and most metals are attacked by phosphoric acid above 350° C. Our corrosion tests have shown that molybdenum and gold are unattacked at 500° C. in ammoniated 100% $H_3PO_4$, whereas the phosphate-resistant super alloys (i.e. alloys with hi]h nickel content) are moderately attacked. Other metals such as copper or silver, alloys of copper or silver, and some other metals are also known to be highly resistant to phosphoric acid. Thus, it is possible to construct efficient heat exchangers using such corrosion resistant metals. However, caution must be exercised since some metals are catalysts for the decomposition of ammonia to hydrogen and nitrogen. Nevertheless, in the case of molybdenum, this decomposition is so slow, that based on published extensive rate data, ten percent decomposition of the ammonia in the system would take in excess of 5–10 years. Thus, molybdenum or molybdenum containing a small amount of zirconium and titanium (TZM) is a good material for constructing the heat exchanger and the stripper such as shown in FIG. 1. A large number of materials, including various metals, graphite, ceramics, and various polymers are suitable materials for construction of the parts of the system such as shown in FIG. 1 which are operated at below 200° C.

Figure 5:
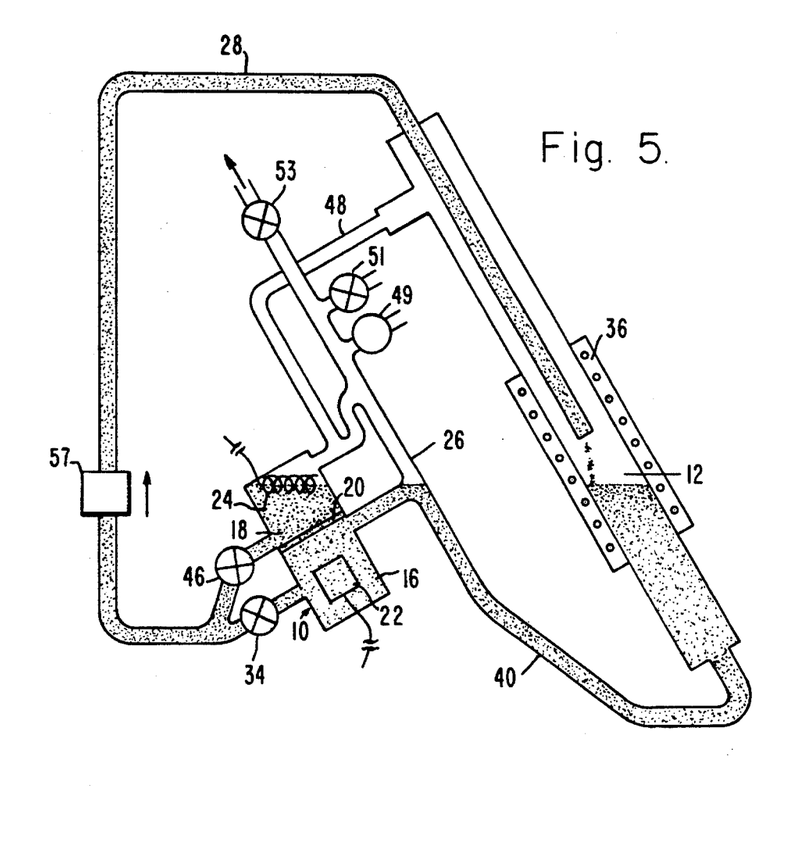
FIG. 5 is a schematic representation of the experimental set up for testing the closed loop system in accordance with a preferred embodiment of the present invention.

In order to verify that no dissipative side reaction occurs in the steady state operation of the entire closed system of the present invention, a very simple closed cycle system was constructed. The system was not designed to measure efficiency or operate at high current density, but simply to operate at steady state in order to prove that the reactants required for electrochemical cell operation could be thermally regenerated. The apparatus used is shown in FIG. 5. No attempt was made to keep ammonia vapor from the cathode side except to provide a smaller liquid surface area interface for ammonia absorption. This was done to accomplish in simple fashion the zero differential pressure control requirement across the fritted glass separator. The inability to block ammonia from the cathode side results in decreased voltages.

In the following description of FIG. 5, structures corresponding to those shown in FIG. 1 are indicated by the same reference designator as used in FIG. 1. As shown in FIG. 5, the cell 10 includes a platinum sheet cathode 22 and a platinum wire gauze anode 24. The electrodes 22 and 24 were connected to an external load, not shown. The electrolyte in the cathode compartment 16 was a mixture of ammonium dihydric phosphate and phosphoric acid. The electrolyte mixture in the anode compartment 18 was initially the same as in the cathode compartment. As the system operated, ammonia and water from the stripper enriched the anode compartment mixture in $(NH_4)_2HPO_4$ and depleted it in $H_3PO_4$. A fritted glass disk served as a separator 20.

Spent electrolytes from the cell 10 were pumped by pump 57 through line 28 into the stripper 12. Surrounding stripper 12, a heating mantle 36 supplied heat for the stripping reaction. When the spent electrolyte contacted the hot walls of the stripper, ammonia was produced. The ammonia, generated in the stripping reaction, was conducted through line 48, directly into the anode compartment 18 where the ammonia was absorbed into the solution. Phosphoric acid, also produced in the stripping reaction, was pumped by pump 57 through line 40, back to the cathode compartment 16. Hydrogen, produced at the cathode 22, bubbled upward through line 26 and into the anode compartment 18, where it was consumed at the anode 24. Valves 34 and 46 determined the flow rates from the cathode compartment 16 and anode compartment 18. A pressure gage 49 was used to monitor pressure in the system. Valve 51 was used to charge the system with hydrogen and was then closed. Valve 53 was used prior to filling the system in order to evacuate air. Voltages and currents were measured by applying a load across leads attached to the anode 24 and cathode 22.

In order to expedite demonstration of the closed loop system using the apparatus of FIG. 5, a few simplifications were made as follows:

a. The heat exchanger was eliminated b. Due to the small size of the system, heat rejection was not necessary for the ammonia condensation process. Hence the gases formed in the stripper were conducted directly into the anode compartment of the cell, thus eliminating the need for a separate condenser. In fact, external heat was needed to maintain the system at its operating temperature.

c. Cooling coils were attached to the molybdenum stripper tube to protect the teflon fittings at either end from excessive heat.

d. the platinum wire gauze used as the anode electrode was an exceedingly low current density electrode. The pure platinum was used to assure the absence of any side reactions e. The pump flow rate was kept high to minimize the time necessary to reach steady state. The flow rate of 2.2 ml/minute, when combined with the system volume of about 150 ml, gave a residence time of 68 minutes.

Parameters investigated were: regenerator upper temperature, total system pressure, ratio of hydrogen to ammonia in the gas phase, and the effect of water in the system. Measured quantities included the cell temperature, stripper temperature, fluid line temperature, system pressure, current output and the IR (current×resistance) corrected voltage. The use of IR compensation eliminates effects of the electrode positioning and resistance of the porous frit separator. A typical experimental run proceeded as follows:

1. The system was evacuated to approximately 1 mmHg.

2. The working fluid mixture, such as the following mixture, was added to the system.

100% $H_3PO_4$-5 mole percent $(NH_4)H_2PO_4$-5 mole percent

3. The pump was started and the fluid level was allowed to stabilize in all parts of the system.

4. Heat to the regenerator and auxiliary heating system was turned on. The coolant pump was turned on.

5. Ammonia and/or hydrogen were added to the desired operating pressure.

6. The cell was adjusted to the desired output current. The voltage was monitored and allowed to stabilize.

7. Operating parameters (i.e. stripper temperature, flow rate, pressure, current, etc.) were changed and the system was allowed to stabilize at the new conditions Experimental output data under the various operating conditions are shown in Table I. In Table I, "OCV" indicates open circuit voltage; "voltage" indicates the voltage obtained with the specified current load; "time" indicates the length of time the system was run. As can be seen from this data, the greatest power output was obtained at a cell temperature of 154° C. and a stripper temperature of 265° C. The working fluid in runs 1 and 3 was a mixture of 95 mole % $H_3PO_4$ and 5 mole % $NH_4H_2PO_4$. A considerable amount of ammonia gas was added to the 95% $H_3PO_4$, 5% $NH_4H_2PO_4$ mixture in run 2.

TABLE I

| | | OUTPUT DATA | | | | |
|---|---|---|---|---|---|---|
| Run # | Cell Temp. | Stripper Temp. | OCV | Current | Voltage | Time |
| 1 | 107° C. | 333° C. | 0.38 v | 5 μA | 0.12 v | 2 hrs. |
| 2 | 154° C. | 265° C. | 0.45 v | 10 μA | 0.35 v | 30 min. |
| 3 | 66° C. | 277° C. | 0.15 v | 1 μA | 0.14 v | 2 hrs. |

Various amounts of water were incorporated by using $H_3PO_4$ of different concentrations as shown in Table II.

TABLE II

| VARIATION IN WATER CONTENT | |
|---|---|
| Run # | Acid Concentrations |
| 1 | 100% by weight |
| 2 | 85% |
| 3 | 95% |

Hydrogen gas was added to the system to bring the total pressure to 1 atmosphere (zero psic) for runs 1 and 3, and 3 psig (pounds per square inch guage) or 21 kilopascals guage for run 2. The pressure of $NH_3$ and $H_2O$ was estimated to be 200 mmHg (3.9 psia) in runs 1 and 3.

Steady state operation for runs 1 and 3 was assured by operating the system well over the 68 minute circulation time for the system. Run 2 appeared to be operating at steady state, but pressure fluctuations in the system caused the two input streams to mix after 20 minutes.

It should be noted that the conditions indicated in the experimental description herein are only intended to demonstrate closed loop operation and do not represent the optimal operating conditions.

In addition to the above-described experimental verification of closed loop operation of the thermoelectrochemical system of the present invention, further experimental tests support the effectiveness and practicality of the system of the present invention. An open circuit voltage of 0.510 volts at 155° C. was obtained with a system employing a cathode compartment in a beaker, an anode compartment in another beaker, and a connecting salt bridge containing a teflon valve which was slightly opened when measurements were made. Solid platinum electrodes and electrolyte concentrations of 100% $H_3PO_4$ cathode solution and a $(NH_4)_3PO_4$ in $(NH_4)_2HPO_4$ anode solution were used. Hydrogen gas pressure was maintained at one atmosphere in the cathode compartment and approximately 0.5 atmosphere in the anode compartment. Ammonia gas pressure to the anode compartment was maintained at 0.5 atmosphere. Therefore the data represents the non-preferred experimental condition in which transference is not restricted to $NH_4^+$ ion. A cation exchange membrane would have insured that transference occurs primarily by $NH_4^+$ ion. Temperature versus open-circuit voltage (OCV) measurements yielded an experimental determination of the heat (enthalpy) of regeneration via the Gibbs Helmholtz equation. The experimental value for heat energy in was 23.7 kilocalories/equivalent. A value of 11.8 kilocalories/equivalent for electrical energy out was calculated from the measured OCV. An efficiency ($\eta$) of 50.0% was calculated using the following equation:

$$\eta = \frac{\text{electrical energy out}}{\text{heat energy in}}$$

Experimental data also shows the effectiveness of the heat exchange process which is required in practising the present invention. Using experimental data in the literature for the relationship of temperature and the vapor pressure of ammonia from $NH_4H_2PO_4$, the integration of the Clausius-Clapeyron equation using this data gave a value of 23.5 kcal/equivalent for the heat of vaporization of $NH_3$ at about 550° C. This value agrees closely with the 23.7 kcal measured for the electrochemical reaction of the present invention. Therefore, the specific heat of $NH_4H_2PO_4$ between 150° C. and about 550° C. equals the specific heats of $NH_3$ plus $H_3PO_4$ between 150° C. and 550° C. Thus, it follows that excellent heat exchange can be accomplished between the $NH_4H_2PO_4$ being heated to about 550°C. and the $H_3PO_4$ and $NH_3$ being cooled down to about 150° C. in practising the present invention. Moreover, additional heat transfer calculations show that, taking all practical losses into account, a realized efficiency of 40%, or 80% of Carnot, should be attainable at power densities of 300 watts per kilogram. The weight of the entire heat engine system shown in FIG. 1 was taken into account, but receiver or radiator weights were not taken into account.

Finally, experimental data indicates favorable kinetics for the preferred reaction used in practising the present invention. Since polarization values for fuel cell electrodes in $H_3PO_4$ at 150°–200° C. are approximately equal for either cathodic or anodic reactions, cathodic polarization losses were compared at platinum sheet electrodes at 150° C. for 100% $H_3PO_4$ and 100% $(NH_4)_2HPO_4$. At 112 millivolts overpotential, 784 milliamperes/cm$^2$ current was attained for 100% $H_3PO_4$ compared to 204 ma/cm$^2$ for the $(NH_4)_2HPO_4$. This result shows that the kinetics in the ammonium phosphates is nearly as rapid as the kinetics of the phosphoric acid fuel cell power plant hydrogen electrodes (which can operate at 1 A/cm$^2$ with losses of only 50 millivolts). In particular, this result suggests that the data for Pd—Ag, where ammonia adsorption could not take place on the gas side, would be very similar for phosphoric acid compared to the ammonium phosphate electrolytes.

The above-described system is capable of operating at efficiencies of 77% of Carnot between 100° C. and 500° C. Its operational temperature rankle makes the system useful as a single cycle heat endline or as a bottoming cycle in a combined cycle converter. The system can be combined with topping cycles such as the Air Brayton, thermionic conversion and sodium heat engine. In addition, the system is safe and environmentally benign so that it can be used in a wide variety of applications such as solar conversion, electric utility industry power conversion, space power conversion, geothermal conversion, nuclear power conversion, remote location power conversion, silent power conversion, and numerous other applications.

Viewing the above-described embodiment of the present invention in more general terms, attention is drawn to the following features of the present invention:

a) The working fluid in the cathode compartment comprises concentrated phosphoric acid. During the cell reaction, hydrogen ions from the phosphoric acid are used up, and hydrogen and $H_2PO_4^-$ are generated. In addition, $NH_4^+$ ion migrates into the cathode compartment through a cation permeable membrane.

b) The working fluid in the anode compartment comprises ammonium phosphate salt in molten form with some water content. During the cell reaction, the phosphate ion from the salt reacts with hydrogen ion to form $HPO_4^{-2}$ and to reduce the hydrogen ion concentration in the anode compartment. Thus, the phosphate ion produces the effect of keeping the hydrogen ion concentration low in the dilute side of the cell (i.e. the anode compartment).

c) In order to keep the cell operating, products formed by the cell reaction are removed from the cell and subjected to process conditions by which the starting materials for the anode compartment and the cathode compartment are regenerated.

d) The phosphoric acid for the cathode compartment is regenerated by direct thermal decomposition of the $NH_4H_2PO_4$ reaction product formed in the cathode compartment.

e) The thermal decomposition of the $NH_4H_2PO_4$ reaction product discussed in item "d" above also produces ammonia and water. This ammonia and water is reacted with the $(NH_4)_2HPO_4$ reaction product which was formed in the anode compartment, to produce $(NH_4)_3PO_4$, which is the starting material for the anode compartment.

While considerable detail has been presented for the preferred embodiment of the present invention in which the working fluids comprise phosphoric acid and molten ammonium phosphates, it is not intended to limit the present invention to these particular working fluids. In view of the generalized discussion immediately above, the working fluids which are suitable for practising the present invention can be characterized as follows. The cathode solution comprises an aqueous solution comprising a minimal amount of water and a concentrated and strong Bronsted acid (i.e. having a p$K_a$ of 3 or less) which is capable of providing a high concentration of hydrogen ions to generate the required voltage. In addition, during the cell reaction, the anion portion of the acid must be capable of combining with the cation of the molten salt from the anode compartment to form a product which can be thermally decomposed to regenerate the acid and to form an intermediate decomposition product. The intermediate decomposition product, in turn, must be capable of combining with the cell reaction product from the anode to regenerate the starting material for the anode reaction. The anode solution comprises a relatively low melting (e.g. 20° to 200° C.) molten salt containing a small amount of water. The anion portion of the salt must be capable of a reaction which reduces the hydrogen ion concentration in the anode compartment. The cation portion of the salt must be capable of transference from the anode compartment through a membrane into the cathode compartment, and must be capable of combining with the anion product formed in the cathode compartment to form a product which can be thermally decomposed to regenerate the acid and to form an intermediate product, as previously discussed.

Having thus described exemplary embodiments of the present invention, it should be noted by those skilled in the art that the disclosures within are exemplary only and that various other alternatives, adaptations and modifications may be made within the scope of the present invention. Accordingly, the present invention is not limited to the specific embodiments as illustrated herein.

What is claimed is:

1. A thermoelectrochemical system for generating an electrical current comprising:
   a) an electrochemical cell having a cathode compartment and an anode compartment, said compartments having a common ion-permeable separation wall;
   b) a cathode and an anode located within their respective compartments, said cathode and anode being connectable externally of said cell for generation of said electrical current;
   c) a cathode solution comprising a concentrated aqueous solution of a chosen strong Bronsted acid located in said cathode compartment and in contact with said cathode wherein hydrogen ions are consumed at said cathode during generation of said electrical current and hydrogen gas and a first cell reaction product are generated;
   d) an anode solution comprising a chosen relatively low melting molten salt solution located in said anode compartment and in contact with said anode wherein the anion of said salt reacts with hydrogen gas to thereby reduce the hydrogen ion concentration in said anode compartment and to form a second cell reaction product, and wherein the cation of said salt is capable of being decomposed by heat to produce hydrogen ions;
   e) thermochemical regenerator means for thermally converting said first cell reaction product to said chosen acid and an intermediate regeneration product;
   f) means for transferring said cathode solution containing said first cell reaction product from said cathode compartment to said thermochemical regenerator means;
   g) cathode recycle means for transferring said chosen acid formed in said thermochemical regenerator means to said cathode compartment to replenish said chosen acid consumed during generation of said electrical current;
   h) means for combining said second cell reaction product from said anode compartment with said intermediate regeneration product from said thermochemical regenerator means to thereby form said molten salt solution;
   i) means for removing heat resulting from said combining in step "h";
   j) means for transferring said intermediate regeneration product produced in said thermochemical regenerator means to said means for combining;
   k) means for transferring anode solution containing said second cell reaction product to said means for combining; and
   l) anode recycle means for transferring said molten salt formed in said means for combining to said anode compartment to replenish said molten salt consumed during generation of said electrical current.

2. A thermoelectrochemical system according to claim 1 further including means for transferring hydrogen gas formed in said cathode compartment to said anode compartment for consumption at said anode during generation of said electrical current.

3. A thermoelectrochemical system according to claim 1 further including storage tanks to separately store said chosen acid regenerated in said thermochemical regenerator means and said molten salt solution formed in said means for combining prior to returning said acid to said cathode compartment and said molten salt solution to said anode compartment.

4. A thermoelectrochemical system according to claim 1 further including storage tanks to separately store said cathode solution containing said first cell reaction product and said anode solution containing said second cell reaction product prior to transfer of said cathode solution to said thermochemical regenerator means and of said anode solution to said means for combining.

5. A thermoelectrochemical system according to claim 1 wherein said means for removing heat is combined with said means for combining.

6. A thermoelectrochemical system according to claim 1 wherein said anode and cathode are inert electrodes.

7. A thermoelectrochemical system according to claim 1 wherein a multiplicity of said electrochemical cells are connected in series.

8. A thermoelectrochemical system for generating an electrical current comprising:
   a) an electrochemical cell having a cathode compartment and an anode compartment, said compartments having a common ion permeable separation wall;
   b) a cathode and an anode located within their respective compartments, said cathode and anode being connectable externally of said cell for generation of said electrical current;
   c) a cathode solution comprising a concentrated aqueous solution of phosphoric acid located in said cathode compartment and in contact with said cathode wherein hydrogen gas and dihydric ammonium phosphate are generated and phosphoric acid is consumed at said cathode during generation of said electrical current
   d) an anode solution comprising a molten salt solution of ammonium phosphate and monohydric ammonium phosphate or monohydric and dihydric ammonium phosphates located in said anode compartment and in contact with said anode wherein ammonium phosphate and hydrogen gas are consumed and monohydric ammonium phosphate or monohydric and dihydric ammonium phosphates are generated at said anode during generation of said electrical current;
   e) thermochemical regenerator means for thermally converting dihydric ammonium phosphate produced in said cathode compartment to phosphoric acid and ammonia;
   f) means for transferring cathode solution containing said dihydric ammonium phosphate from said cathode compartment to said thermochemical regenerator means;
   g) cathode recycle means for transferring phosphoric acid formed in said thermochemical regenerator means to said cathode compartment to replenish the phosphoric acid consumed during generation of said electrical current;
   h) means for removing heat from said phosphoric acid formed in said thermochemical regenerator means and transferring said heat to said transferred cathode solution;
   i) ammonium phosphate regenerator means for combining ammonia and monohydric ammonium phosphate to form ammonium phosphate and for condensing water vapor;
   j) means for removing heat resulting from said combining in step "i;"

k) means for transferring ammonia and water produced in said thermochemical regenerator means to said ammonium phosphate regenerator means for combination and reaction with monohydric ammonium phosphate;

l) means for transferring anode solution containing monohydric ammonium phosphate to said ammonium phosphate regenerator means for combination and reaction with ammonia to form said ammonium phosphate;

m) anode recycle means for transferring the ammonium phosphate formed in said regenerator means to said anode compartment to replenish the ammonium phosphate consumed during generation of said electrical current.

9. A thermoelectrochemical system according to claim 7 wherein said thermochemical regenerator means includes:

means for heating said cathode solution to a temperature within the range of about 300° to 650° C. to thermally convert dihydric ammonium phosphate to phosphoric acid and ammonia; and means for separating the ammonia from the dihydric ammonium phosphate.

10. A thermoelectrochemical system according to claim 8 wherein said system is charged with a working fluid comprising 0.1–6 parts on a mole basis of monohydric ammonium phosphate, 0.1–2 parts dihydric ammonium phosphate, 0.1–2 parts phosphoric acid, and 0.1–50 parts water.

11. A thermoelectrochemical system according to claim 8 wherein said anode and said cathode are formed of a material selected from the group consisting of platinum, palladium, palladium-silver alloy, and porous graphite-Telfon platinized fuel cell electrodes.

12. A thermoelectrochemical system according to claim 8 wherein the pressure in said system is within the range of about 5 to 400 pounds per square inch absolute (34 to 2760 kilopascals).

13. A thermoelectrochemical system according to claim 8 wherein said means for removing heat in step "h" is combined with said ammonium phosphate regenerator means of step "i."

14. A method for generating an electrical current between an anode and a cathode comprising the steps of:

a) contacting a cathode with a cathode solution comprising a concentrated aqueous solution of phosphoric acid, said cathode and cathode solution being located in a cathode compartment, said cathode compartment having an ion permeable separation wall in common with an anode compartment;

b) contacting an anode with an anode solution in said anode compartment, said anode solution comprising a molten salt solution of ammonium phosphate and monohydric ammonium phosphate or monohydric and dihydric ammonium phosphates, said anode and cathode being connectable for generation of said electrical current therebetween, and wherein hydrogen gas and dihydric ammonium phosphate are generated and phosphoric acid is consumed at said cathode during generation of said electrical current and wherein ammonium phosphate and hydrogen gas are consumed and monohydric ammonium phosphate or monohydric and dihydric ammonium phosphates are generated at said anode during generation of said electrical current;

c) introducing hydrogen gas into said anode compartment;

d) removing cathode solution containing dihydric ammonium phosphate from said cathode compartment;

e) thermally converting the dihydric ammonium phosphate in the removed cathode solution to phosphoric acid, ammonia, and water;

f) transferring heat from said thermally generated phosphoric acid to said removed cathode solution containing dihydric ammonium phosphate;

g) transferring the thermally generated phosphoric acid to said cathode solution to replenish phosphoric acid consumed during generation of said electrical current;

h) removing anode solution containing monohydric ammonium phosphate from said anode compartment;

i) reacting the monohydric phosphate in the removed anode solution with the ammonia formed in step "e" to form ammonium phosphate;

j) condensing and reacting the water formed in step "e" with monohydric ammonium phosphate in the removed anode solution to form ammonium phosphate solution;

k) removing the heat resulting from the reacting of steps "i" and "j;"

l) transferring the ammonium phosphate produced from the reaction of monohydric ammonium phosphate with ammonia to said anode compartment to replenish the ammonium phosphate consumed during generation of said electrical current.

15. A method according to claim 14 wherein said dihydric ammonium phosphate is thermally converted by heating the dihydric ammonium phosphate in the removed cathode solution to a temperature of at least about 300° C. to convert the dihydric ammonium phosphate to phosphoric acid and ammonia.

16. A method according to claim 14 wherein the hydrogen gas generated at said cathode is removed from the cathode compartment and introduced into said anode compartment for reaction at said anode.

17. A method according to claim 14 wherein said anode and cathode are inert electrodes.

18. A method according to claim 14 wherein the temperature of said anode solution and said cathode solution is maintained at 100° C. or higher.

19. A method according to claim 14 wherein said system is charged with a working fluid comprising 0.1–6 parts on a mole basis of monohydric ammonium phosphate, 0.1–2 parts dihydric ammonium phosphate, 0.1–2 parts phosphoric acid, and 0.1–50 parts water.

20. A thermoelectrochemical system according to claim 1 wherein step "k" further comprises means for transferring a portion of said anode solution containing said second cell reaction product to said thermochemical regenerator means.

21. A thermoelectrochemical system according to claim 8 wherein step "l" further comprises means for transferring a portion of said anode solution containing said monohydric ammonium phosphate to said thermochemical regenerator means.

22. A method according to claim 14 wherein step "h" further comprises separating a portion of said removed anode solution and thermally treating said portion.

* * * * *